United States Patent
Brockschmidt et al.

(10) Patent No.: US 10,284,042 B2
(45) Date of Patent: May 7, 2019

(54) TWO-LAYER HIGH-VOLTAGE INSULATION SYSTEM AND ELECTRICAL MACHINE

(71) Applicant: SIEMENS AKTIENGESELLSCHAFT, München (DE)

(72) Inventors: Mario Brockschmidt, Essen (DE); Peter Gröppel, Erlangen (DE); Friedhelm Pohlmann, Essen (DE); Claus Rohr, Mannheim (DE); Roland Röding, Ellrich (DE)

(73) Assignee: SIEMENS AKTIENGESELLSCHAFT (DE)

( * ) Notice: Subject to any disclaimer, the term of this patent is extended or adjusted under 35 U.S.C. 154(b) by 956 days.

(21) Appl. No.: 14/384,847

(22) PCT Filed: Mar. 18, 2013

(86) PCT No.: PCT/EP2013/055544
§ 371 (c)(1),
(2) Date: Sep. 12, 2014

(87) PCT Pub. No.: WO2013/143901
PCT Pub. Date: Oct. 3, 2013

(65) Prior Publication Data
US 2015/0042198 A1 Feb. 12, 2015

(30) Foreign Application Priority Data

Mar. 26, 2012 (EP) .................................. 12161154

(51) Int. Cl.
*H02K 3/34* (2006.01)
*H01B 7/02* (2006.01)
(Continued)

(52) U.S. Cl.
CPC ............... *H02K 3/345* (2013.01); *H01B 3/08* (2013.01); *H01B 3/445* (2013.01); *H01B 3/48* (2013.01);
(Continued)

(58) Field of Classification Search
CPC ...... H01B 17/42; H01B 17/32; H01B 17/325; H01B 17/66; H01B 3/08; H01B 3/008;
(Continued)

(56) References Cited

U.S. PATENT DOCUMENTS 4,966,886 A * 10/1990 Hoshiko ............... H01B 12/14
174/125.1
6,140,733 A * 10/2000 Wedde ................... H02K 3/345
310/196

FOREIGN PATENT DOCUMENTS

CN 1223026 A 7/1999
CN 1223750 A 7/1999
(Continued)

OTHER PUBLICATIONS

Chinese Office Action, dated Dec. 28, 2015, issued in Chinese Patent Application No. 201380017161.5. English Translation. Total 13 pages.I.
(Continued)

*Primary Examiner* — Jennifer A Steele
(74) *Attorney, Agent, or Firm* — Ostrolenk Faber LLP

(57) ABSTRACT

By using an electrically conductive PTFE fabric, high-voltage insulation systems are simplified and can be made thinner, also improving the thermal conductivity. The insulation material is in two layers, each with a hydrophobic and a hydrophobic region, and the hydrophobic regions of the layers are opposed.

13 Claims, 3 Drawing Sheets

(51) Int. Cl.
    *H01B 17/42*    (2006.01)
    *H02K 3/30*    (2006.01)
    *H01B 3/48*    (2006.01)
    *H02K 3/40*    (2006.01)
    *H01B 3/44*    (2006.01)
    *H01B 3/08*    (2006.01)

(52) U.S. Cl.
    CPC ........... *H01B 7/0241* (2013.01); *H01B 17/42* (2013.01); *H02K 3/30* (2013.01); *H02K 3/40* (2013.01)

(58) Field of Classification Search
    CPC . H01B 3/18; H01B 3/24; H01B 3/445; H01B 3/48; H01B 7/0241; H01B 7/0208; H01B 7/0216; H01B 7/0225; H01B 7/0258; H01B 7/0266; H01B 7/0275; H02K 3/30; H02K 3/345; H02K 3/40; Y10T 428/2933; Y10T 428/2936
    See application file for complete search history.

(56) References Cited

FOREIGN PATENT DOCUMENTS

| | | | | |
|---|---|---|---|---|
| DE | 336008 | * | 6/1987 | ............... H02K 3/40 |
| DE | 42 19 064 A1 | | 12/1993 | |
| EP | 0 978 926 A1 | | 2/2000 | |
| EP | 0978926 A1 | * | 2/2000 | ............. H02K 3/345 |
| WO | WO 97/43817 A1 | | 11/1997 | |

OTHER PUBLICATIONS

International Search Report dated May 7, 2013 issued in corresponding International patent application No. PCT/EP2013/055544.
Written Opinion dated May 7, 2013 issued in corresponding International patent application No. PCT/EP2013/055544.
Office Action dated Sep. 20, 2017 in corresponding European Patent Application No. 13 713 770.9 (total 3 pages).

* cited by examiner

PRIOR ART

TWO-LAYER HIGH-VOLTAGE INSULATION SYSTEM AND ELECTRICAL MACHINE

CROSS-REFERENCE TO RELATED APPLICATIONS

The present application is a 35 U.S.C. §§ 371 National Phase conversion of PCT/EP2013/055544, filed Mar. 18, 2013, which claims priority of European Patent Application No. 12161154.5, filed Mar. 26, 2012, the contents of which are incorporated by reference herein. The PCT International Application was published in the German language.

TECHNICAL BACKGROUND

The invention relates to a high-voltage insulation system and to an electrical machine containing the system.

High-voltage insulation systems are used, in particular, for external potential grading in rotating electrical machines.

In rotating electrical machines, such as motors or generators, the reliability of the insulating system is decisively responsible for their operational reliability. The insulating system has the task of permanently insulating electrical conductors (wires, coils, bars) from one another and from the laminated stator core or the surroundings. The external potential grading has the task of establishing electrical contact between the laminated stator core which is at ground potential and the outer side of the main insulation. This ensures that no partial discharges occur in voids in the region of the boundary layer of the insulation and the laminated core.

A distinction must be made here between
- external corona shielding (ECS) for generator winding bars which have been produced by single bar production (ECS-S) and
- external corona shielding (ECS) for generator winding bars which have been produced by means of the GVPI process (ECS-G).

In the case of globally impregnated stator windings (Global Vacuum Pressure Impregnation GVPI), the entire laminated core with a fully fitted winding is impregnated and cured altogether. As a result, the adhesive bonding of the winding in the slots of the laminated core is so strong that the different coefficients of expansion of the copper, iron and insulation lead to high thermomechanical stresses between the copper, insulation and iron, which may lead to the boundary surfaces tearing apart after a certain number of thermal cycles (starts and stops of the generator). In order to prevent the gaps from lying in the electrical field, and the partial discharges igniting there from destroying the insulation, an internal potential grading (IPG) is used, represented in FIG. 1 as a double-layered external corona shielding (ECS).

IPG:

An insulating base winding 70 of fine-mica tape is applied over the current-carrying Roebel bar of copper conductor elements 40, said insulating base winding smoothing and increasing the edge radii of the thin copper conductor elements 40.

A first graphite-containing conductive nonwoven tape 100 is wound over said insulating base winding, said conductive nonwoven tape being connected to the high-voltage potential of the copper conductor element 40 by way of a contact strip 130 at only one point.

ECS:

Only then is the main insulation 160 of fine-mica glass wound. Instead of the copper conductor elements, the first conductive nonwoven tape 100 now forms the high-voltage electrode. It is permanently adhesively bonded to the main insulation. Following on top of the main insulation 160 is the inner external corona shielding winding 110, an outermost separating tape 190 and an outer external corona shielding winding 200. An external corona shielding tape, which is woven in the outermost separating tape 190, connects the inner external corona shielding winding 110 and the outer external corona shielding winding 200.

The thermomechanical stresses occurring between the copper conductor assembly and the insulation during the starting and stopping of the generator may after a certain operating time lead to instances of local detachment of the insulating sleeve from the conductor, without the feared partial discharges igniting in the gaps that are produced. The region of the delamination is potential-free, because the high-voltage potential has been transferred to the conductive nonwoven that becomes baked fast on the main insulation. This IPG design at the highly stressed inner boundary layer between the conductor and the insulation allows turbogenerators to be operated at peak load for decades without any notable aging due to partial discharge.

For generator winding bars which are realized in line with single bar production technology, an external corona shielding is applied in the form of an electrically conductive tape or coating. With this technology, impregnated insulations in a metal form are cured, in order to realize the desired geometry of the insulation. In the process, electrically conductive coatings are applied after the curing, electrically conductive tapes are applied before the curing.

The object of the invention is therefore to solve the abovementioned problems.

The figures and the description represent only exemplary embodiments of the invention.

Figure 1:
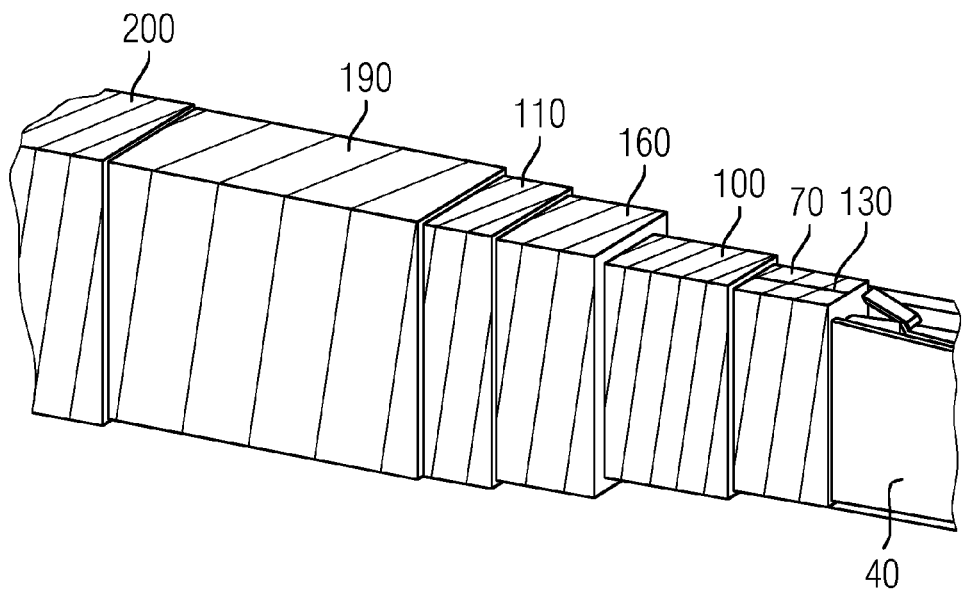
FIG. 1 shows an external potential grading of a generator winding bar according to the prior art.
Figure 2:
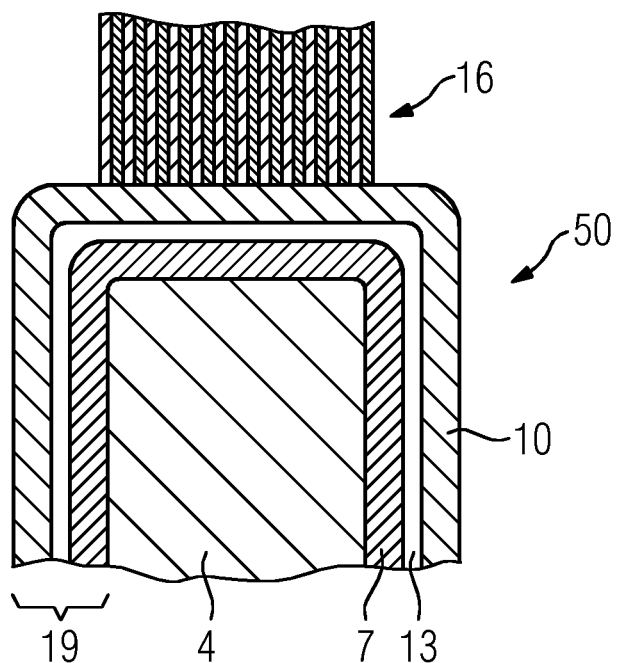
FIGS. 2, 3 show an insulation system according to the invention.

FIG. 2 shows an exemplary arrangement of an insulation 50, in particular for the layers 190, 200 in FIG. 1. In this exemplary embodiment, there is an insulation layer 19 around a metal bar 4, in order to insulate said metal bar from the laminated core 16. The insulation layer 19 preferably has two layers 7, 10. Each of the layers 7, 10 is preferably wound in the form of a tape and they together form the insulation layer 19. The layers 7, 10 preferably comprise a woven fabric which, in turn, preferably comprises fibers.

There is a contact area 13 between the layers 7, 10. The layers 7, 10 are preferably formed by wound tapes, preferably comprising a woven fabric.

Figure 3:
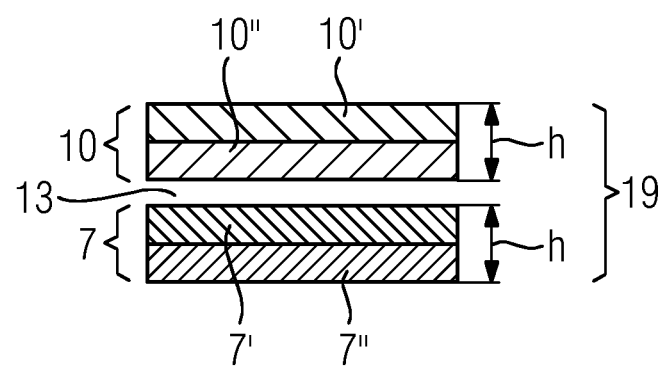

FIG. 3 illustrates the layers 7, 10 in greater detail in cross section. The layers 7, 10 have different physical properties, in particular in each case a hydrophobic region 7', 10" and a non-hydrophobic (hydrophilic) region 7", 10'. The upper or outer region 10' of the layer 10 is hydrophilic, whereas the lower or inner region 10" is hydrophobic. The layer 7 is of inverse construction, with its upper or inner region 7' being hydrophobic. When these two layers 7, 10 or the tapes 7, 10 are wound one over the other, the hydrophobic regions 7', 10" bear against one another, and advantageously can be displaced in relation to one another.

Owing to the hydrophilic portion, impregnation of each layer, as already described above, is very readily possible, but not in the region of the contact area 13, and therefore relative displacement of the tapes in the region of the contact area 13 in relation to one another for compensating mechanical stresses is ensured.

The material of the layers 7, 10 is preferably PTFE which is correspondingly changed for the hydrophilic regions 10', 7''. This change is performed, for example, by locally coating the PTFE, the fibers or the woven fabric, or else is performed by a hydrophilic material being applied to a hydrophobic region 10'', 7' composed of PTFE and forms the region 7'', 10'.

It is possible to use the ratio of the widths of the tapes 7, 10 to adjust the adhesion between the outside insulation and the surface of the surrounding laminated core in a wide range. This can likewise be performed by varying the degree of overlap of the two tapes 7, 10.

A combination of these two types of woven fabric ensures that the occurrence of thermomechanical stresses can be reduced and sufficient adhesion of the overall system is ensured, without a bar 4 slipping within the slot. Electrical contact is always ensured at the same time.

The thicknesses of the individual regions of the layers 7, 10 (FIGS. 2 and 3) with the hydrophilic and hydrophobic regions 7', 7'', 10', 10'' each preferably have a thickness of 10 μm-50 μm or preferably represent values from generator construction.

The layer thickness of the layers 7, 10 is accordingly 20 μm-100 μm.

The material for the hydrophobic region 10'', 7' preferably contains PTFE, is preferably a PTFE layer or PTFE-coated woven fabric or nonwoven fabric (FIGS. 2 and 3). PTFE is to be understood to mean all further developments based on PTFE.

The material for the hydrophilic regions 7'', 10' is known from generator construction and the known high-voltage insulation systems and is preferably graphite-coated woven fabric or a nonwoven fabric, wherein the woven fabric or nonwoven fabric represent a glass woven fabric or glass nonwoven fabric (FIGS. 2 and 3).

The objective for ECS-O (O=overhang corona shielding):
improved impregnation
reduced layer thickness
defined and constant surface resistance irrespective of the impregnation
improved service life and reliability
improved adhesion and temperature stability
simplified application since the number of production steps is reduced.
Requirements for ECS-O:
surface resistance after the application of 2-50 kOhm (surface square resistance)
layer thickness<=100 μm
maximum width 30 mm
good processability: sufficient strength and also stability during cutting (no fraying), sufficient tensile strength for winding.

The invention involves using electrically conductive PTFE (Teflon) as insulation, in particular for a high-voltage insulation system of this kind. Said high-voltage insulation system may be a simple system or a more complex system as in FIG. 1. The PTFE is a composite material.

The high-voltage insulation system in FIG. 1 comprises a woven fabric composed of PTFE, wherein this is structurally designed such that the woven fabric or the high-voltage insulation system has pores which can be infiltrated as above in accordance with the described process.

The high-voltage insulation system alternatively therefore preferably comprises fibers composed of PTFE, wherein the fibers are preferably mixed with an electrically conductive material, preferably graphite, to achieve the electrical conductivity for electrically non-conductive PTFE.

The woven fabric is preferably formed from fibers of this kind.

The PTFE fibers can likewise contain electrically conductive material, such as graphite.

This woven fabric is preferably present in tape form and for the application is wound around onto the surface to be insulated.

This is preferably realized by the use of electrically conductive PTFE woven fabric which exhibits the following advantages:
good impregnability, since it is a porous woven fabric and can therefore be applied before the curing,
unchanged resistance before and after the impregnation, since the conductivity is attributable to fibers and not to particles as in the case of ECS tape. (These have a different resistance value in comparison to the initial value on account of the polymer matrix enveloping the particles after the impregnation),
a simplified and thinner design of the external corona shielding system for globally impregnated rotating machines is possible owing to the use, according to the invention, of electrically conductive materials which have hydrophobic properties. The reason for this is that mica splittings no longer have to be used. In the prior art, said mica splittings have the task of reducing any thermomechanical stresses by means of partial delamination.
a simplified and thinner design of the external corona shielding system for globally impregnated rotating machines is possible owing to the use, according to the invention, of hydrophobic materials which have electrically conductive properties. The reason for this is that the interweaving of a conductive tape for making contact
with the outside of the insulation and the outer side of the laminated core no longer has to be used. In the prior art, said interweaving has the task of compensating for differences in potential when delamination occurs.

The objectives for ECS-G are:
simplified application/cost reduction
reduced layer thickness of the double ECS by thinner alternatives
dispensing with mica splittings
permanent electrical contact in the region of the outer side of the insulation and of the laminated core, even after thermally induced delamination
void-free ECS
improved thermal conductivity.

The approach for ECS-G is:
reduction of the layer thickness by using a separating layer, which provides defined mechanical decoupling without causing the electrical resistance to change. This is intended to be accomplished by replacing the double layer of mica splittings with hydrophobic types of woven fabric or films. This may be, in particular, a Teflon fabric.

Figure 4:
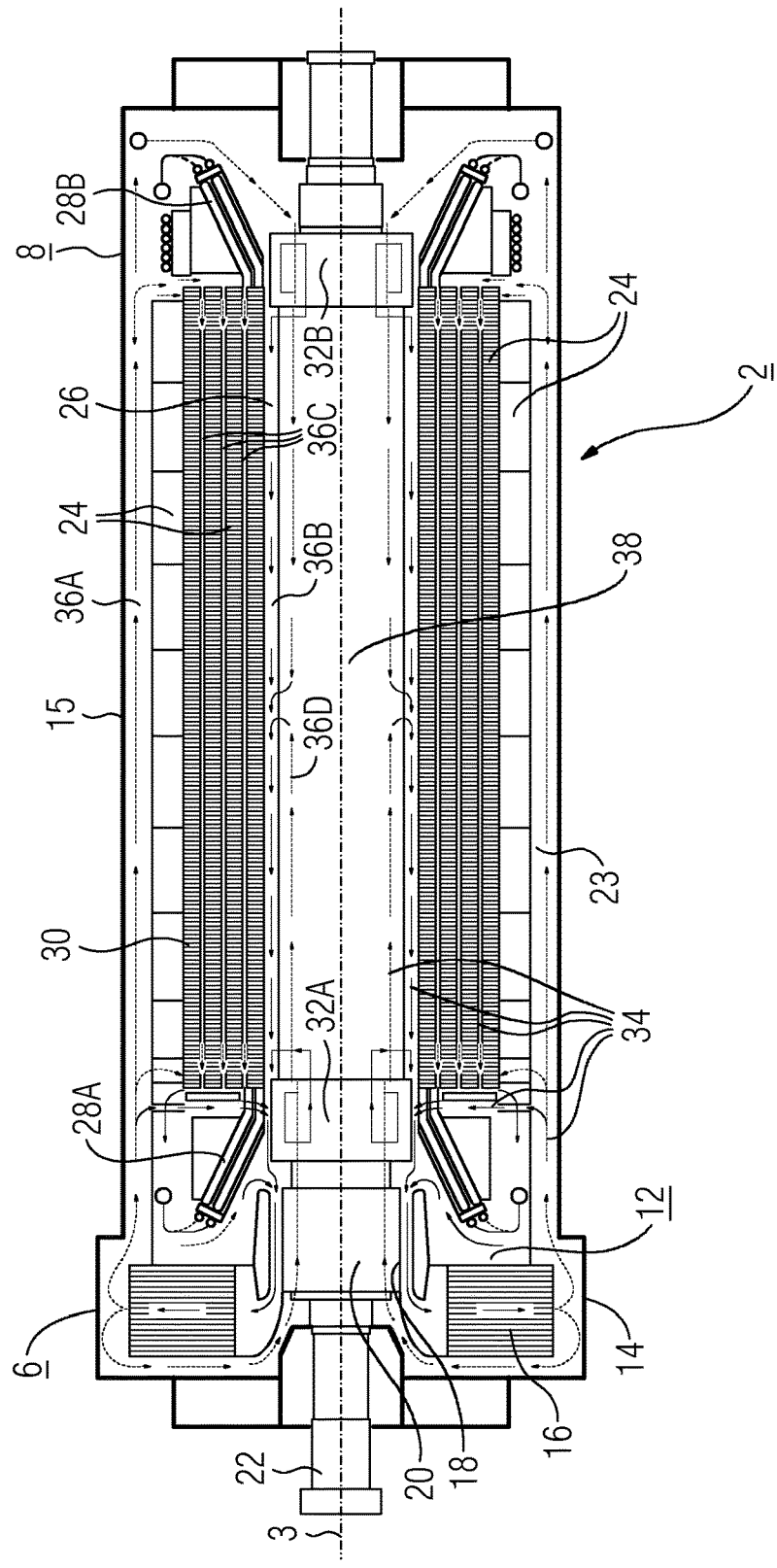
FIG. 4 shows a generator.

FIG. 4 shows, by way of example, a generator as the electrical machine. According to FIG. 4, a rotary machine arrangement, in particular a generator arrangement 2, extends along a longitudinal axis 3 from a turbine-side end region 6 to an excitation-side end region 8. The generator arrangement 2 has a housing 15. A cooling device 12 is arranged in the turbine-side end region 6. To be precise, two coolers 16 and a compressor in the form of a fan 18 having a fan hub 20 are arranged in a cooler head 14 which is a part of the housing 15. The fan hub 20 is seated on a rotor 22 which extends along the longitudinal axis 3 through the generator arrangement 2. The actual generator region 23 is arranged so as to follow the cooling device 12 in the direction of the longitudinal axis 3. In this region, the rotor 22 is surrounded by a stator 24 such that an air gap 26 is formed. The stator 24 has a stator winding having a turbine-side stator winding overhang 28A and having an excitation-side stator winding overhang 28B. A so-called laminated core 30 is arranged between the two stator winding overhangs 28A, 28B. Analogously to the stator 24, the rotor 22 has a turbine-side rotor winding overhang 32A and an excitation-side rotor winding overhang 32B.

On account of the high power density that is customary in turbogenerators, it is necessary to cool the generator arrangement 2 in the generator region 23. In this case, the stator winding overhangs 28A, 28B and also the rotor winding overhangs 32A, 32B have a particularly high cooling requirement. In order to cool the generator region 23, said generator region has a cooling system 34 which is supplied with cooling gas by the cooling device 12. The cooling system 34 has a number of cooling gas ducts 36A, D, 48 via which the cooling gas is circulated. In this case, a first cooling gas duct 36A extends in the axial direction and is arranged between the stator 24 and the housing 10. A second cooling gas duct 36B is formed by the air gap 26. Further cooling gas ducts 36C which extend in the axial direction lead through the laminated core 30. In order to cool the rotor 22, a cooling gas duct 36D leads through said rotor. The cooling gas flow in the generator region 23 and also in the cooling device 12 is indicated in each case by arrows, wherein the dashed arrows indicate the flow path of the cold cooling gas and the solid arrows indicate the flow path of the heated cooling gas (hot gas).

In order to cool the stator winding overhangs 28A, 28B, the cooling gas flow coming from the coolers 16 is divided in the turbine-side end region 6. One partial flow serves for cooling the turbine-side stator winding overhang 28A and the other partial flow is forwarded via the cooling gas duct 36A to the excitation-side stator winding overhang 28B and divided once again. One part serves for cooling the stator winding overhang 28B and flows back again from there as hot gas via the air gap 26. The other part is conducted through the cooling gas ducts 36C of the laminated core 30 and emerges as hot gas in the turbine-side end region 6 and is fed to the coolers 16. In order to cool the rotor winding overhangs 32A, 32B, cooling gas is introduced into the cooling gas duct 36D of the rotor 22 both from the turbine-side end region 6 and from the excitation-side end region 8. A partial flow of the cooling gas flows through the respective rotor winding overhangs 32A, 32B and is subsequently conducted into the air gap 26 as hot gas and fed to the coolers 16. The remaining partial flow is guided further through the rotor 22 in the cooling gas duct 36D, to be precise in such a way that the cooling gas from the two rotor winding overhangs 32A, 32B flows toward one another and is conducted into the air gap 26 approximately in the central region 38 of the generator region 23.

The invention claimed is:

1. A high-voltage insulation system comprising:
    at least one insulation layer; and
    the at least one insulation layer comprised of two layers, each of the two layers has a respective upper region and a respective lower region which have different physical properties, the upper region of one layer and the lower region of the other layer are positioned to face outward away from each other and are both hydrophilic, and the lower region of the one layer and the upper region of the other layer are hydrophobic and face each other in their respective layers,
    wherein the two layers comprise PTFE woven fibers, and the hydrophilic regions include at least one of a coating on the PTFE woven fibers and a hydrophilic material applied on the PTFE woven fibers.

2. The high-voltage insulation system as claimed in claim 1, wherein the respective hydrophobic regions of the two layers are arranged one on the other with a contact region between the hydrophobic regions.

3. The high-voltage insulation system as claimed in claim 1, wherein each of the two layers is formed of a wound tape.

4. The high-voltage insulation system as claimed in claim 3, wherein respective lateral widths of the respective tapes for each of the two layers are different.

5. The high-voltage insulation system as claimed in claim 3, wherein the tape layers overlap to a degree selected to determine mechanical strength of the insulation system.

6. The high-voltage insulation system as claimed in claim 1, wherein each of the two layers is formed of a wound tape comprising the woven fibers.

7. The high-voltage insulation system as claimed in claim 1, wherein the two layers comprise pores configured to be infiltratable.

8. The high-voltage insulation system as claimed in claim 1, wherein the two layers comprise a fabric formed of the woven fibers, and the fibers are mixed with electrically conductive material.

9. The high voltage insulation system as claimed in claim 1, wherein the thickness of each of the hydrophobic regions and the thickness of each of the hydrophilic regions is between 10 µm and 50 µm.

10. The high-voltage insulation system as claimed in claim 1, wherein each of the hydrophilic regions contains graphite, or a graphite-coated woven fabric.

11. An electrical machine having a high-voltage insulation system as claimed in claim 1.

12. The high-voltage insulation system as claimed in claim 2, wherein the hydrophilic regions are configured to permit them being impregnated, while the hydrophobic regions oppose each other at the contact region between them to prevent impregnation across the contact region.

13. The high-voltage insulation system as claimed in claim 8, wherein the electrically conductive material is graphite.

* * * * *